United States Patent [19]

Kutzschebauch

[11] 4,148,406
[45] Apr. 10, 1979

[54] WARP BEAM TRANSPORT CARRIAGE FOR TWIN WARP BEAMS

[75] Inventor: Gerhard Kutzschebauch, Dirlos Dicker Turm, Fed. Rep. of Germany

[73] Assignee: System Schultheis GmbH & Co., Fulda, Fed. Rep. of Germany

[21] Appl. No.: 821,833

[22] Filed: Aug. 4, 1977

[30] Foreign Application Priority Data

Aug. 6, 1976 [DE] Fed. Rep. of Germany ....... 2635524

[51] Int. Cl.² .............................................. B60P 3/00
[52] U.S. Cl. .................................... 414/458; 28/201; 242/58.6; 414/684; 414/911
[58] Field of Search ............... 214/390, DIG. 4, 77 P, 214/130 B, 130 C, 130 R, 1 D; 28/201, 208; 242/58.6

[56] References Cited

U.S. PATENT DOCUMENTS 3,433,499  3/1969  Meierhofer ..................... 242/58.6 X

FOREIGN PATENT DOCUMENTS 2001624  7/1971  Fed. Rep. of Germany ............. 28/201
686771   3/1965  Italy ......................................... 28/201

Primary Examiner—Albert J. Makay
Attorney, Agent, or Firm—Robert J. Koch

[57] ABSTRACT

A warp beam transport and elevating carriage for twin warp beams is disclosed having a longitudinally extending shaft capable of rotation about its longitudinal axis, a plurality of gripper arms fixed to the shaft and extending downwardly to securely support twin warp beams at each end, and twin warp beams mouned for transport and elevation without danger of displacement of dislodgement.

8 Claims, 8 Drawing Figures

WARP BEAM TRANSPORT CARRIAGE FOR TWIN WARP BEAMS

BACKGROUND OF THE INVENTION

1. Field of the Invention

This invention concerns a warp beam transport and elevating carriage warp for twin beams. More particularly, the invention relates to transport and elevating carriages for twin warp beams having a longitudinally extending shaft on the carriage for supporting twin warp beams through gripper arms at each of the ends of the twin warp beams. The longitudinally extending shaft is rotated to produce elevation and lowering of the twin warp beams.

2. Description of the Prior Art

Carriages for transport and elevation of warp beams are known in the art. One such device provides a carriage frame with a longitudinally extending support shaft. The support shaft support the warp at its side on gripper arms. Rotation of the support shaft is performed to raise or lower the warp beam. Thus, the same carriage is used for both transport of the warp beam and elevation thereof.

In another known apparatus for transport of warp beams, the support sturcture is arranged to carry twin warp beams. These devices provides gripper arms. not only at each end of the carriage, but also in the center portion thereof to provide support for each end of the twin warp beams, i.e. not only the outside ends but also the inside ends of each of the warp beams.

Known elevating carriages of the above-mentioned type are not especially suitable for the transportation of twin warp beams because the support surface of the gripper arm in the center portion of the twin warp beam is necessarily quite small. Serious disadvantages often result when the support becomes inadequate to hold the warp beam ends during periods of vibration or abrupt bumping or shock. Vibrations during the transport of the warp beams can already lead to a sliding off of one or both beams from the support surface of the middle gripper arm. This presents a problem in the transportation of twin beams with the warp elevating carriage of the known type of construction.

SUMMARY OF THE INVENTION

The invention, therefore, essentially has as its major object to provide a warp beam elevating and supporting carriage capable of supporting twin or multiple warp beams during transport without the occurrence of difficulties in maintaining the twin or multiple warp beams in proper functional supported position.

Another object of an embodiment of the present invention is the employment of gripper arms to support a warp beam and at the same time to exert a force in an axial direction against the outside ends of the warp beams.

A further object of the present invention is the arrangement in a preferred embodiment of a connecting support for the gripper arms to a longitudinally extending shaft which permits pendulum-like motion and which strictly follows the rotational movement of the shaft, i.e. movement in a plane perpendicular to the axis of the shaft is controlled by rotation of the shaft.

An advantage of the warp beam elevating carriage of the present invention is that multiple warp beams can be securely supported for transport and elevation by a relatively simple arrangement of gripper arms engaging each end of the warp beams.

An additional advantage is that elevation of a warp beam may efficiently be effected by rotation of a longitudinally extending shaft to which the gripper arms are attached by a particular connecting arrangement.

Other objects and advantages will become apparent from the following more detailed description of the invention, and the disclosure of the preferred embodiments. Specific reference will also be made to the drawings of certain of the important features and characteristics described and claimed hereinafter.

DETAILED DESCRIPTION OF THE INVENTION

In accordance with this invention, the objects and advantages are accomplished while the problems of the prior art devices are solved in that the gripper arms or simply grippers, as they will be called, engage the ends of the twin beams and are so configured that they assume a position in the axial direction which acts against the ends of the twin multiple beams. Because of the action of the grippers on the ends of the twin or multiple beams, changes in position, which deleteriously influence the support of the beam from the center support do not occur even during transport. The gripper arms are secured to the longitudinally extending shaft by means of a clamping arrangement of the bearing ends of the gripper arms to the shaft. The shaft itself may be rotated, and in so doing, carries the gripper arms with the movement to bring about the elevation or lowering of the warp beams.

The broad description of the invention, therefore, includes a warp beam transport and elevation carriage comprising a carriage frame, a longitudinally extending shaft mounted on the carriage frame for rotational movement about the longitudinal axis of the shaft, a plurality of warp beams mounted along the longitudinally extending shaft, means for gripping the end portions of the warp beams and connecting the warp beams with the longitudinally extending shaft, whereby resolution of a moment of force from the weight of the warp beams secures the gripping means to the warp beams. As a particularly advantageous means for gripping the warp beam end portions, the invention provides a plurality of gripper arms connected at one end to the longitudinally extending shaft and, at the other end, to the end portion of the warp beam.

In detail, the arrangement in accordance with this invention is such that the gripper arms are suspended from supports on the shaft, in the manner of a pendulum and that the pendulum axis is obliquely crossing the direction of the shaft. For each gripper arm, the oblique direction points upwards and toward the opposite end of the warp beam.

In this manner, the invention provides that the warp beams, which are engaged at its outside ends by the gripper arms, under their own weight, are subjected to an axial force through the pendulum-like suspension of the; gripper arms, and the orientation of the pendulum axis. A force component acts in the axial direction against the end of the respective warp oppositely to a like force component exerted at the other opposite end of the warp beam where the other pendulating gripper arm is positioned.

In a preferred embodiment, the supports each consist of a bushing, which is displacable on the shaft, but which is rotatably connected with the shaft. The shaft may advantageously have a hexagonal cross-section as commonly employed in the art, and the bushing then has a corresponding inside cross-section.

The pendulum-like gripper arm is provided by means of a hinge-like member, which is formed by a forked configuration of the gripper arm end and a radial projection of the support which engages between the legs of the fork, as well as a swivel pin which extends through the legs of the fork and the projection.

By means of a stop near the hinge point, an excessive pendulating movement of the gripper arms from the ends of the beams is prevented.

The drawings schematically illustrates several embodiments of the invention.

FIG. 1 is a side view of a warp beam elevating and supporting carriage;

FIG. 2 separately illustrates a twin beam;

Figure 1:
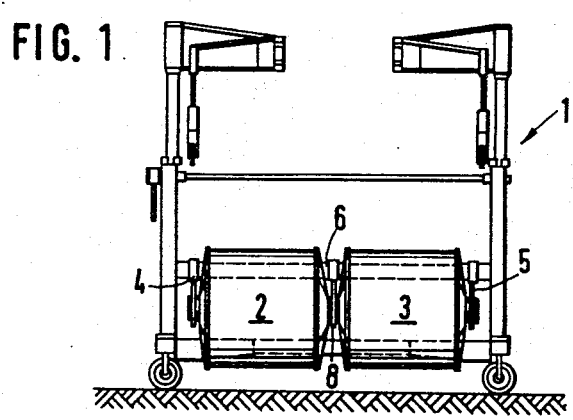

FIG. 1 shows a warp beam elevating and transport carriage, designated as 1 in its entirety. The twin warp beam consists of parts 2 and 3. At the ends, the twin warp beam is supported by grippers 4 and 5 which are each located through a bushing 7, on the hexagonal shaft 6, and projected from it. In the center portion 6, the ends of the warp beams which face each other, are supported on gripper 8. For the purpose of rotating the shaft 6, a hydraulic activating device is provided, which is not illustrated. By means of the rotation of shaft 6, the grippers are brought into the engagement position on the twin warp beam, and the warp beam is raised or lowered, when shaft 6 is rotated in one direction or the other.

Figure 2:
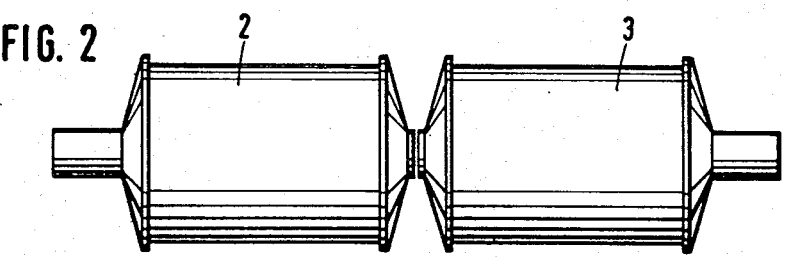

FIG. 2 shows a separate drawing of a twin warp beam.

Figure 3:
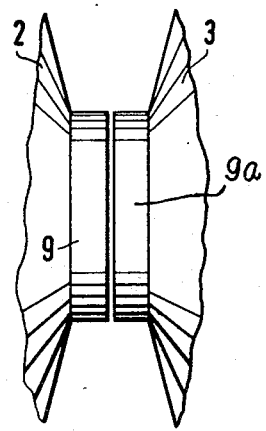
FIG. 3 represents the normal positioning of the middle portion of the twin warp beams.
Figure 4:
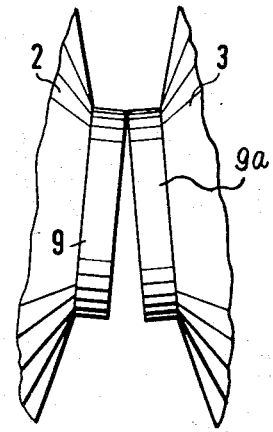
FIG. 4 illustrates the position in the middle portion of the twin warp beam often occuring in prior art devices during transportation.

FIG. 3 shows the normal position of the ends 9 and 9a of the warp beams 2, 3 according to FIG. 2. FIG. 4 shows the frequently occurring transportation position encountered in prior art devices in which the beams separate horizontally and then slip out of the middle bearing suspending arm.

Figure 5:
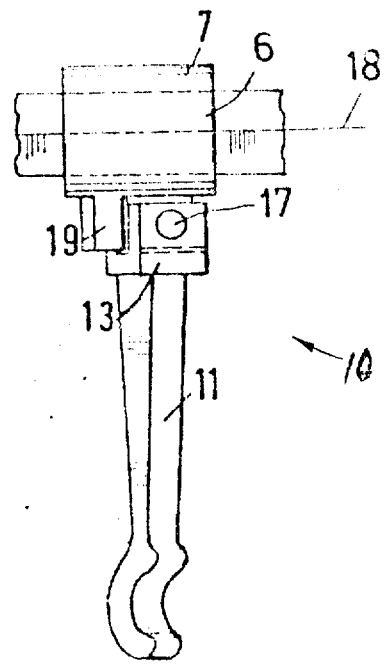
FIG. 5 shows the left outer gripper arm according to FIG. 7 at an enlarged scale.
Figure 6:
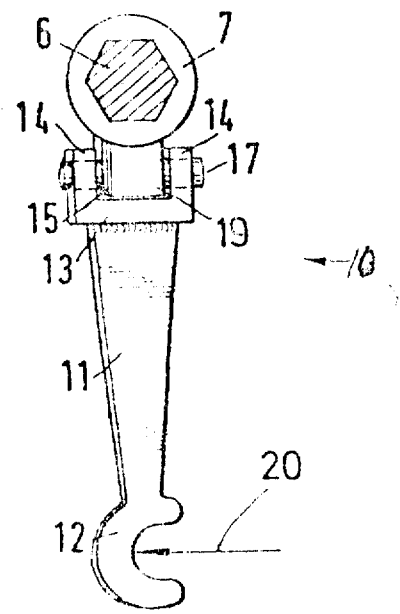
FIG. 6 is a side view of the gripper arm, as viewed from the left, according to FIG. 5.
Figure 7:
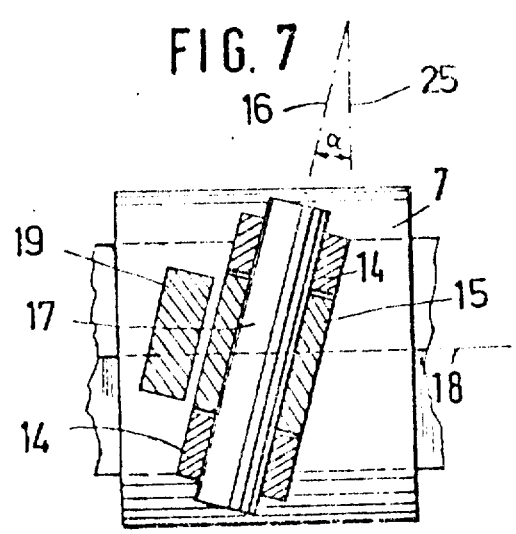
FIG. 7 shows a section through the pendulum mounting of the gripper arm to the bushing on the shaft, viewed from below, according to FIG. 5.

This serious problem is avoided in accordance with this invention in that grippers 4 and 5 are configured as clamping grippers in accordance with FIGS. 5 to 7. In FIGS. 5 and 6, the gripper, which is located on shaft 6 on its one end, is designated as 10 in its entirety. The gripper for the other end is not separately illustrated because it is symmetrical to the gripper in accordance with FIGS. 5 to 7. The grippers are pendulately suspended on shaft 6 through bushing 7.

The gripper 10 consists of an arm 11, of which one end forms a jaw 12 for engaging the end of the warp beam. The other end 13 forms a fork with legs 14. A radial hub 15 of bushing 7 engages between legs 14. Bushing 7 has a hexagonal inside cross-section and is axially displacable on the hexagonal shaft 6. Swivel pin 17 is placed through projection 15 and legs 14 and constitutes the pendulum axis 16. The swivel axis is oblique to the axial direction 18 of shaft 6. It forms an angle x with a plane 25 perpendicular to axis 18 and is directed upwards and inwards against the warp beam. The swivel motion of the gripper arm 11 away from the warp beam end can be constrained by stop 19.

Figure 8:
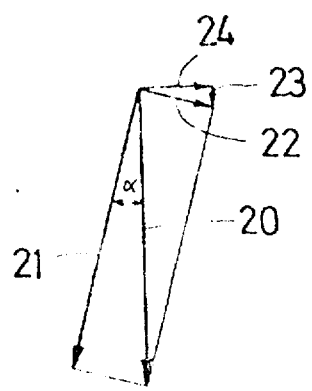
FIG. 8 illustrates the action of the forces.

The force diagram resulting from the load of the warp beam is illustrated in FIG. 8. The force given by the weight of the warp beam is designated as 20. Force 20 is resolved into a component 21 parallel to axis 16 and supported by projection 15, and a component 22 perpendicular thereto and causing a momentum about axis 16. Component 22 can be resolved into components 23 and 24. Component 24 acts as axial force against the left end of warp beam 2. A like force acts against the right end of warp beam 3. The horizontal forces 24, each acting on one end, hold the warp beams 2, 3 together and assure that the normal position illustrated in FIG. 3 is maintained and a position in accordance with FIG. 4 cannot develop.

What is claimed is:

1. A warp beam transport and elevating carriage comprising:
   a carriage frame;
   a longitudinally extending shaft mounted on the carriage frame for rotational movement about the longitudinal axis of the shaft;
   a plurality of warp beams mounted along the longitudinally extending shaft;
   means for gripping the end portions of the warp beams and connecting the warp beams with the longitudinally extending shaft wherein said gripping means comprises gripper arms each connected at one end to the longitudinally extending shaft and extending pendularly downward about an axis oblique to the axial direction of the longitudinally extending shaft whereby resolution of a moment of force from the weight of the warp beam secures the gripping means to the warp beams by exerting a thrust through the lower end of the outside gripper arms against the outside end portions of the warp beams.

2. The warp beam transport and elevating carriage of claim 1, wherein each gripper arm is connected to a support which is non-rotatably attached to said shaft.

3. The warp beam transport and elevation carriage of claim 2, wherein the outside gripper arms are connected to said support pendulatingly about an oblique axis directed upwardly and inwardly against the warp beams.

4. The warp beam transport and elevating carriage in accordance with claim 2, wherein the supports each consist of a bushing axially displaceable on the shaft and rotatable with the shaft.

5. The warp beam transport and elevating carriage according to claim 4, wherein the shaft has a hexagonal cross-section and the bushing has a corresponding inside cross-section.

6. The warp beam transport and elevating carriage according to claim 3, wherein the ends of the outer gripper arms connecting to the longitudinally extending shaft comprise a fork-like portion and a radial projection of the support engages between the legs of the fork, a swivel pin being inserted through the legs of the fork and the radial projection.

7. The warp beam transport and elevating carriage according to claim 6, wherein a stop is provided on the support to constrain the pendulating movement of the gripper arms in a direction opposite to the action against the ends of the warp beam.

8. The warp beam transport and elevating carriage according to claim 1, wherein the adjacent inside end portions of the warp beams cooperate with a single center gripper arm.

* * * * *

UNITED STATES PATENT AND TRADEMARK OFFICE
CERTIFICATE OF CORRECTION

PATENT NO. : 4,148,406

DATED : April 10, 1979

INVENTOR(S) : Gerhard Kutzschebauch

It is certified that error appears in the above—identified patent and that said Letters Patent is hereby corrected as shown below:

Insert the Sheet of Drawings containing Figs. 5, 6, 7 and 8 as part of Letters Patents. (See Attachment).

Signed and Sealed this

Fifteenth Day of September 1981

[SEAL]

Attest:

Attesting Officer

GERALD J. MOSSINGHOFF

Commissioner of Patents and Trademarks